(12) United States Patent
Lo (10) Patent No.: US 6,298,668 B1
(45) Date of Patent: Oct. 9, 2001

(54) ICE CREAM MACHINE USING SEMICONDUCTOR REFRIGERATOR

(75) Inventor: Hou On Lo, Hong Kong (HK)

(73) Assignee: Front Direction Industrial Ltd., Hong Kong (CN)

( * ) Notice: Subject to any disclaimer, the term of this patent is extended or adjusted under 35 U.S.C. 154(b) by 0 days.

(21) Appl. No.: 09/618,774

(22) Filed: Jul. 18, 2000

(30) Foreign Application Priority Data

Jun. 30, 2000 (CN) .................................................. 00118464

(51) Int. Cl.$^7$ ...................................................... F25B 21/02
(52) U.S. Cl. .................................. 62/3.2; 62/3.62; 62/340
(58) Field of Search .............................. 62/3.2, 3.6, 3.62, 62/3.63, 340, 345

(56) References Cited

U.S. PATENT DOCUMENTS

| | | | |
|---|---|---|---|
| 4,441,334 | * 4/1984 | Cipelletti | 62/258 |
| 4,891,949 | * 1/1990 | Caldarola | 62/3.2 |
| 5,016,446 | * 5/1991 | Fiedler | 62/342 |
| 6,041,614 | * 3/2000 | Yamaya et al. | 62/340 |

* cited by examiner

Primary Examiner—Henry Bennett
Assistant Examiner—Melvin Jones
(74) Attorney, Agent, or Firm—Alix, Yale & Ristas, LLP (57) ABSTRACT

An ice cream machine for household use employs semiconductor refrigeration to produce an efficient, compact and non-polluting appliance. The ice cream machine includes a refrigeration plate, a heat radiator, a cold container, a motor and a stirring shaft. The refrigeration plate includes a plurality of P-N junction semiconductor refrigerators. The ice cream maker includes a power supply to provide 12VDC power to the semiconductor refrigerators. A thermal guiding device conducts heat from the cold container to the refrigeration plate.

9 Claims, 8 Drawing Sheets

ICE CREAM MACHINE USING SEMICONDUCTOR REFRIGERATOR

BACKGROUND OF THE INVENTION

1. Field of the Invention

This invention relates generally to ice cream machines. More particularly, this invention relates to an ice cream machine that uses a semiconductor refrigerator.

2. Description of the Related Art

Conventional ice cream machines do not use a semiconductor refrigerator as a cooling source. Ice cream machines typically have used ice/salt mixtures or conventional Chloro-Fluoro-Carbon (CFC) based refrigeration units to provide the cooling needed to freeze ice cream. Ice/salt machines are messy and seldom achieve the cold temperatures needed to properly freeze ice cream. CFC based units have a tendency to be bulky and expensive. CFC based units also have the disadvantage of containing pollution causing chemical refrigerants. Semiconductor refrigerator technology has now developed to an extent that semiconductor refrigeration can be used to form a small volume, high efficiency ice cream maker that does not require use of pollution causing refrigerants.

SUMMARY OF THE INVENTION

A preferred embodiment of an ice cream maker in accordance with the present invention includes a three part casing shell, a refrigeration plate, a heat radiator, a cold container, a motor and a stirring shaft. The refrigeration plate abuts tightly to the bottom of the cold container for maximum heat transference. The heat radiator is positioned below the refrigeration plate to remove heat from the refrigeration unit. The stirring shaft is positioned in the cold container for stirring the ice cream mixture during the freezing process. The motor drives the stirring shaft.

The refrigeration plate employs P-N junction semiconductor refrigeration technology to provide a compact, highly efficient ice cream maker containing no CFC pollutants.

An object of the invention is to provide an ice cream machine using a semiconductor refrigerator.

These and other objects, features and advantages of the invention will become readily apparent to those skilled in the art upon reading the description of the preferred embodiments, in conjunction with the accompanying drawings.

DETAILED DESCRIPTION OF THE PREFERRED EMBODIMENTS

With reference to FIGS. 1–12, wherein like numerals refer to similar parts, the basic components of an ice cream machine 100 in accordance with the present invention include lower, back and top casing shells 14, 13, 12, a power switch 1, a refrigeration plate 3, a heat radiator 5, a cold container 7, a motor 9 and a stirring shaft 10. The refrigeration plate 3 is positioned immediately below and in direct contact with the cold container 7 within the lower shell casing 14. A cooling fan 4 directs airflow over the heat radiator 5 in the bottom of the lower shell casing 14. The power switch 1 is mounted to the top casing shell 12.

Figure 1:
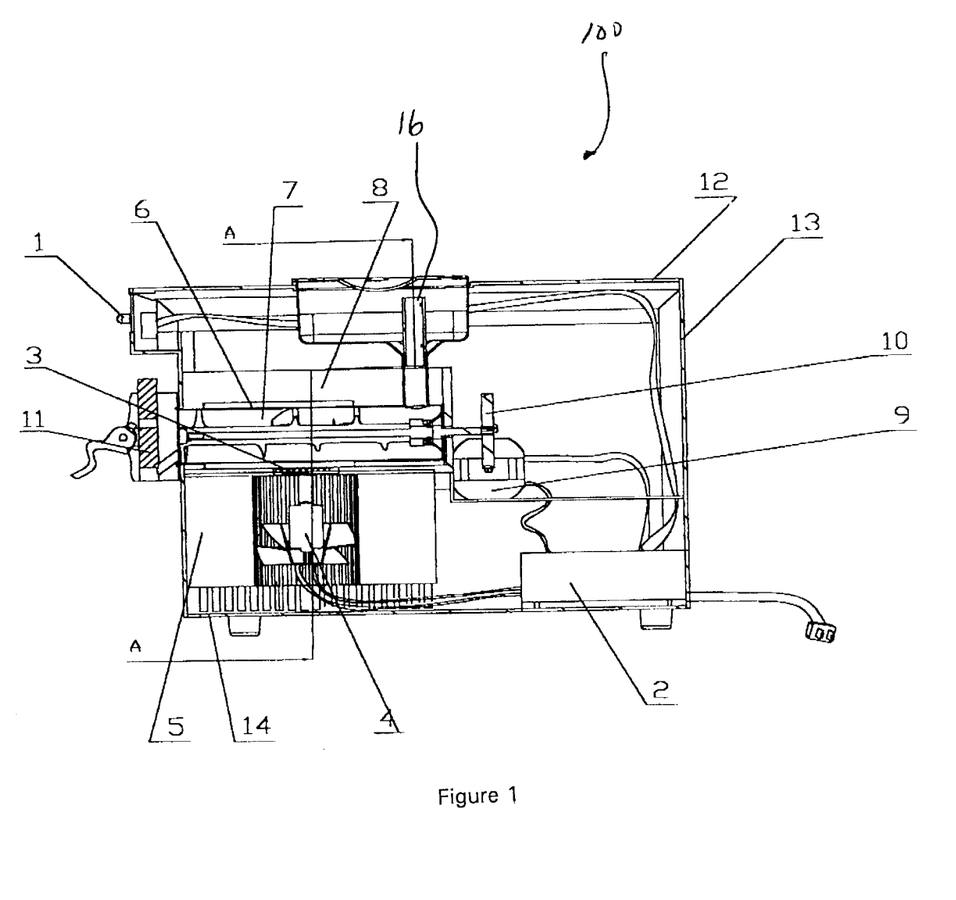
FIG. 1 is a side sectional view through an ice cream machine in accordance with the present invention.
Figure 2:
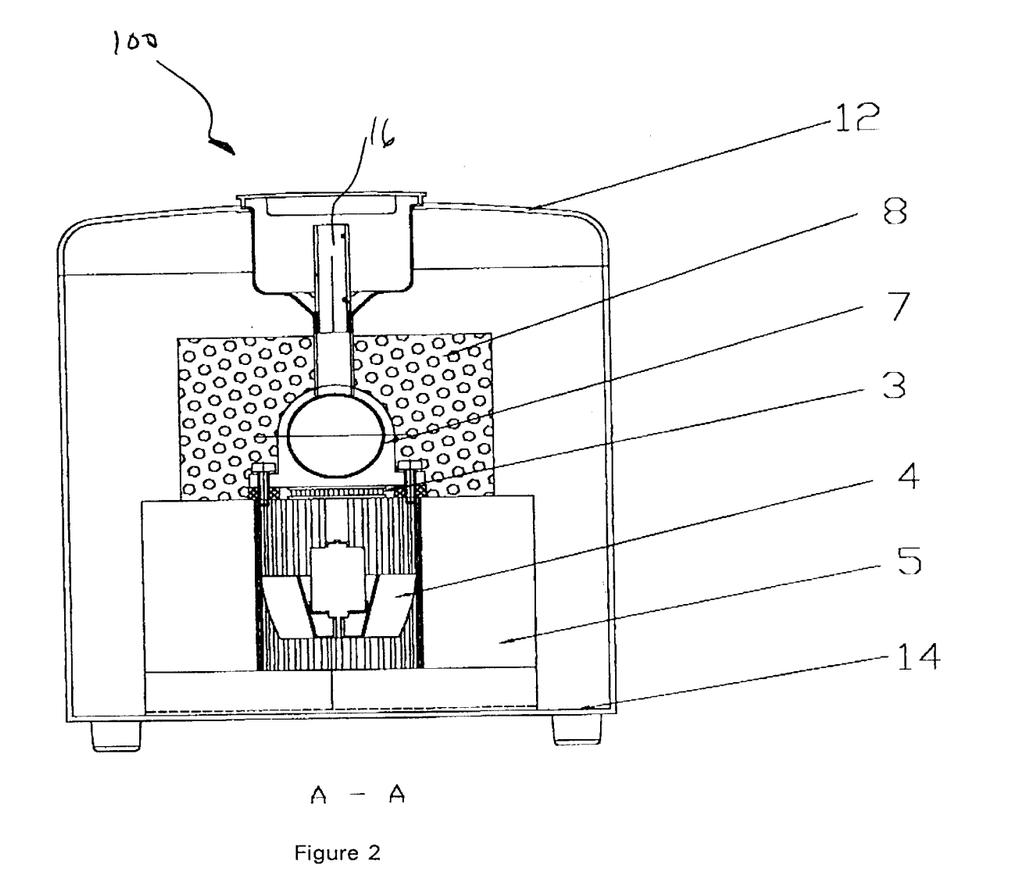
FIG. 2 is a sectional view through the ice cream machine of FIG. 1, taken along line A—A thereof.
Figure 3:
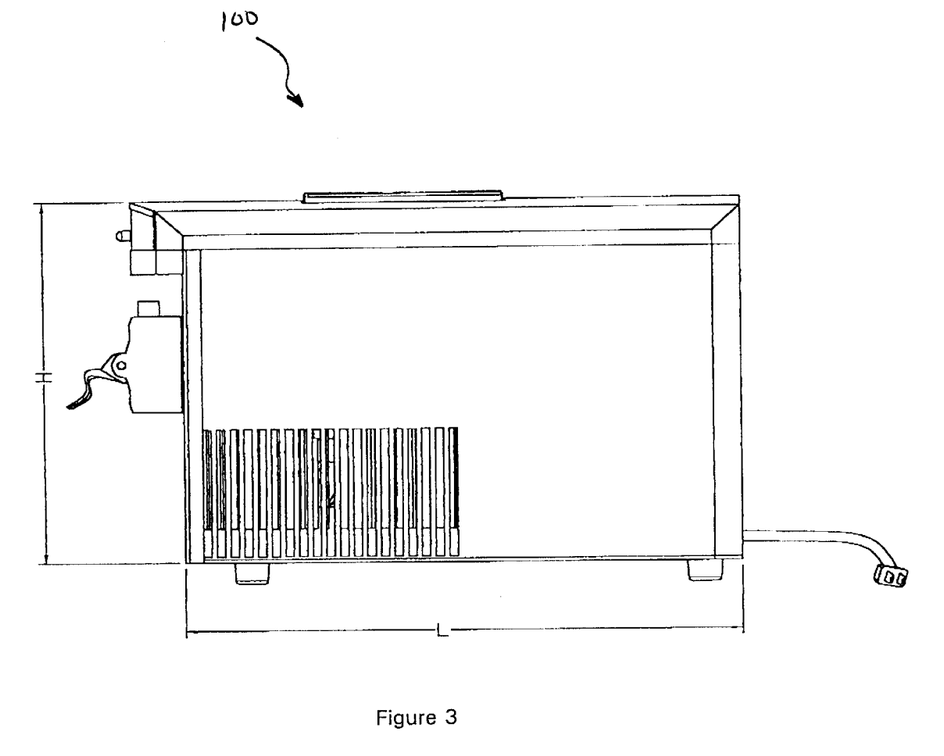
FIG. 3 is an exterior side view of the ice cream machine of FIG. 1.
Figure 4:
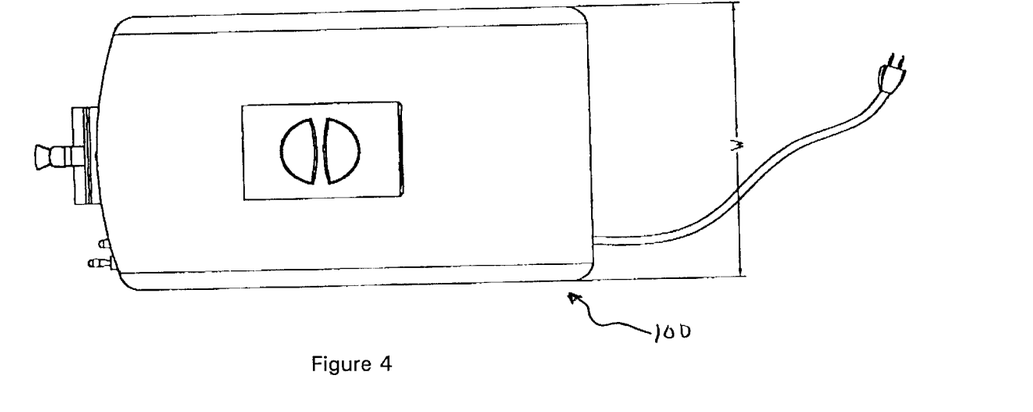
FIG. 4 is a top exterior view of the ice cream machine of FIG. 1.
Figure 5:
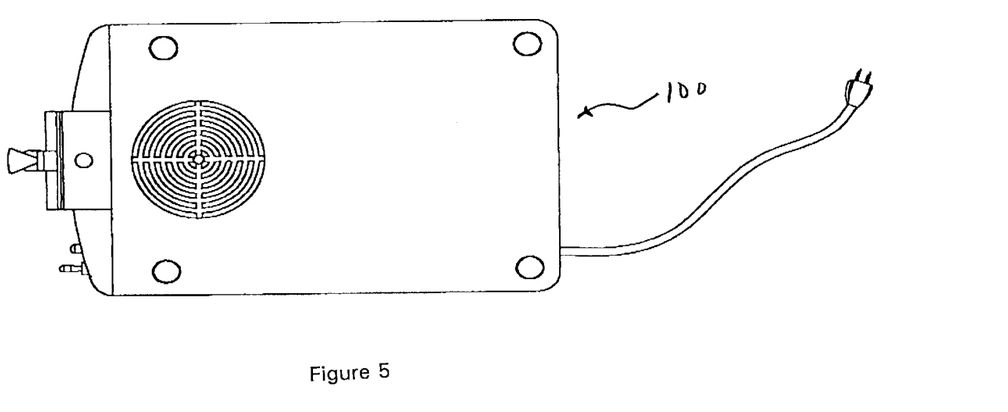
FIG. 5 is a bottom exterior view of the ice cream machine of FIG. 1.
Figure 6:
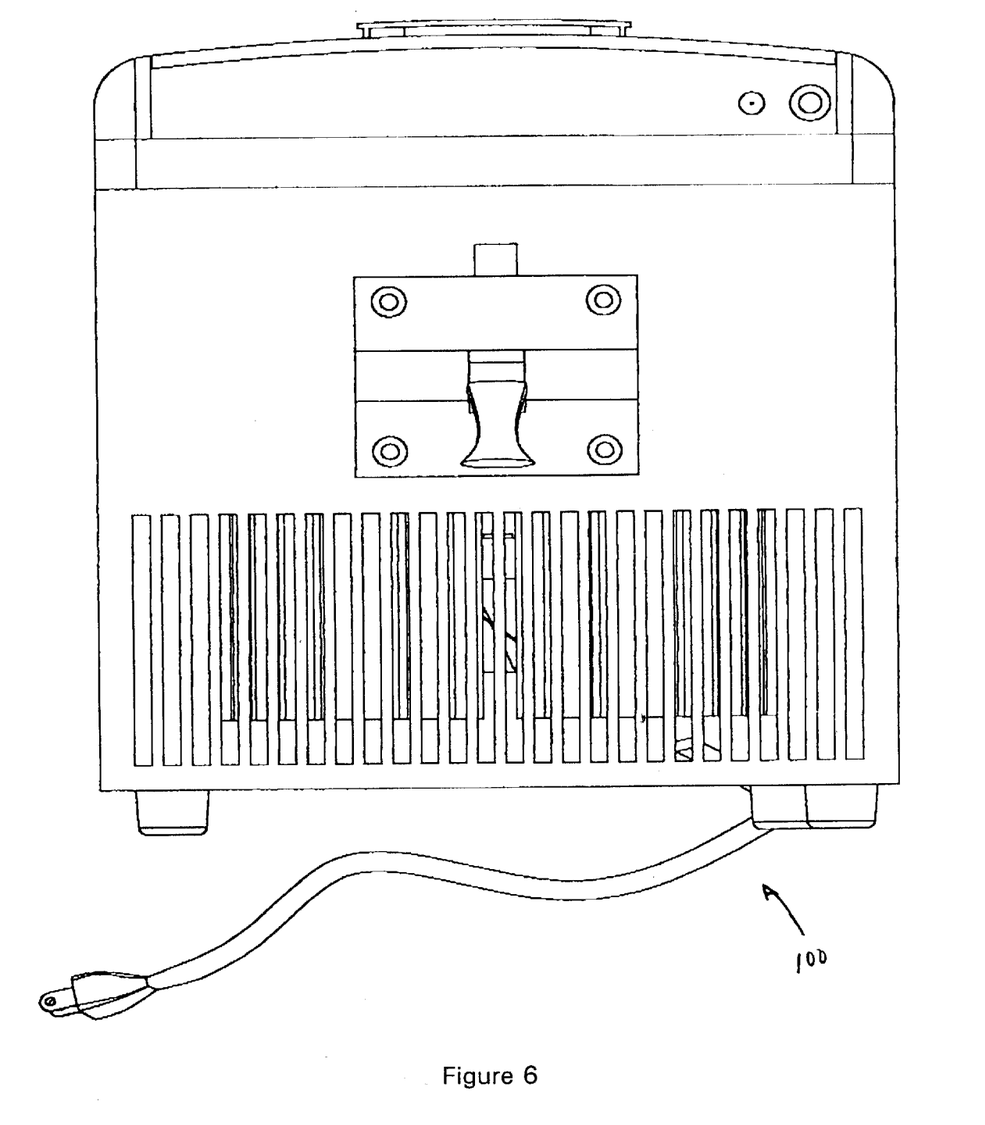
FIG. 6 is a front end exterior view of the ice cream machine of FIG. 1.

The refrigeration plate 3, motor 9 and cooling fan 4 are supplied with 12VDC power by the power supply 2. The power supply 2 includes a rectifier and transformer for converting household voltage of 120 or 220VAC to 12VDC. The power switch 1 is used to selectively apply household voltage to the power supply 2. The motor and cooling fan might alternatively be powered by household AC power.

The refrigeration plate 3 is connected to a thermally conductive guiding device 6 which is positioned above and at least partially surrounding the cold container 7, effectively providing a thermal path surrounding the cold container 7. The cold container 7, refrigeration plate 3 and the guiding device 6 are surrounded by expanded plastic insulating material 8 to insulate the chilled portions of the ice cream machine from the heat of the surrounding atmosphere and heat generated by other components within the ice cream machine.

An ice cream mixture is poured into the cold container 7 through an opening 16. The motor 9 drives the stirring shaft 10 to rotate a spiral agitator 17 rotatably mounted within the cold container 7. The ice cream mixture is chilled and blended to form soft serve ice cream which may then be extruded through an outlet opening controlled by a control bar 11.

When the power switch 1 is turned on, household voltage is applied to the power supply 2, which supplies 12VDC to the refrigeration plate 3, motor 9 and cooling fan 4. (It should be noted that the motor 9 and the cooling fan 4 might alternatively be powered directly by household voltage.) Application of 12VDC to the refrigeration plate 3 produces a cold face on the side of the refrigeration plate 3 in contact with the guiding device 6 and a hot face on the side of the refrigeration plate 3 in contact with the heat radiator 5. Heat is conducted from the cold container 7 to the refrigeration plate 3 by the thermally conductive guiding device 6. Within the refrigeration plate 3, heat is moved from the cold face to the hot face by semiconductor refrigeration. Heat at the hot face is conducted to the heat radiator 5 and dissipated into air forced over the heat radiator by the cooling fan 4.

Figure 7:
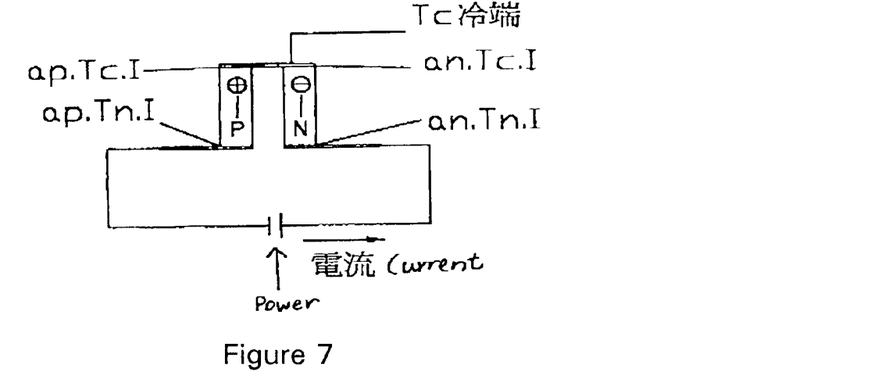
FIG. 7 is a schematic diagram illustrating the semiconductor refrigeration principal employed in an ice cream maker in accordance with the present invention.
Figure 8:
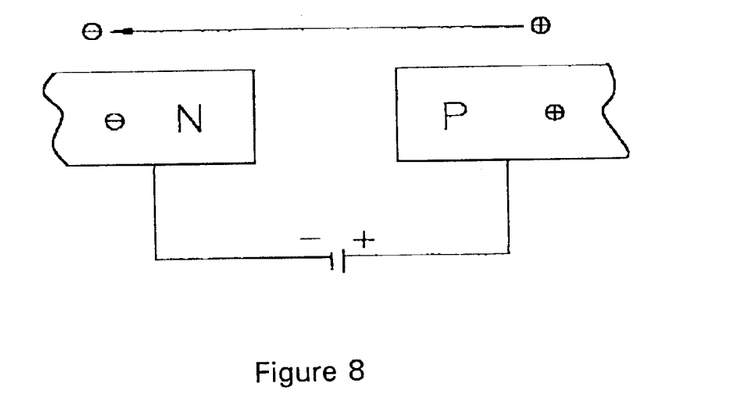
FIGS. 8 and 9 are schematic diagrams illustrating electron movement in a semiconductor refrigerator in accordance with the present invention.

Use of semiconductor refrigeration permits production of an extremely compact and portable ice cream maker 100. FIGS. 3–6 illustrate the appearance and size of one embodiment of an ice cream maker 100 in accordance with the present invention. As illustrated, the ice cream maker 100 has a rectangular box-like shape with a height H of approximately 30 cm, a length L of approximately 40 cm and a width of approximately 28 cm The operating principals of the semiconductor refrigerator incorporated into the refrigeration plate (3) are best described with reference to FIGS. 7–11. Semiconductor refrigeration is based on the Peltier effect, that is, that exothermic and endothermic effects occur when current flows through junctions between dissimilar materials. FIG. 7 illustrates the simplest unit of a semiconductor refrigerator, a single P-N semiconductor thermocouple. A P-N type semiconductor thermocouple preferably incorporates P-type semiconductor material (Bi2Te3-Sb2Te3) and N-type semiconductor material (Bi2Te3-Bi2Te3). The P-type and N-type semiconductors are connected at one end by a metallic connection. The opposing end of the P-type semiconductor material is connected to the negative pole (−) of the DC power supply and the N-type semiconductor material is connected to the positive pole (+) of the DC power supply. Current flows from the N-type semiconductor material to the P-type semiconductor material, causing an endothermic effect at the metallic connection. A corresponding exothermic reaction occurs at the opposing end of the N-type and P-type semiconductor materials.

Figure 9:
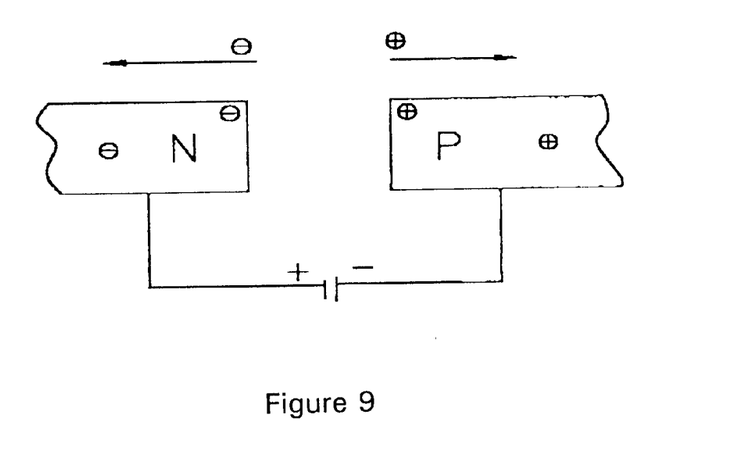
Figure 10:
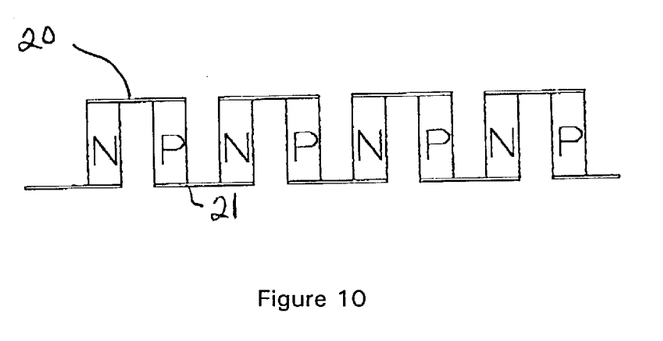
FIG. 10 is a schematic diagram of a semiconductor refrigeration pile suitable for use in an ice cream machine in accordance with the present invention.
Figure 11:
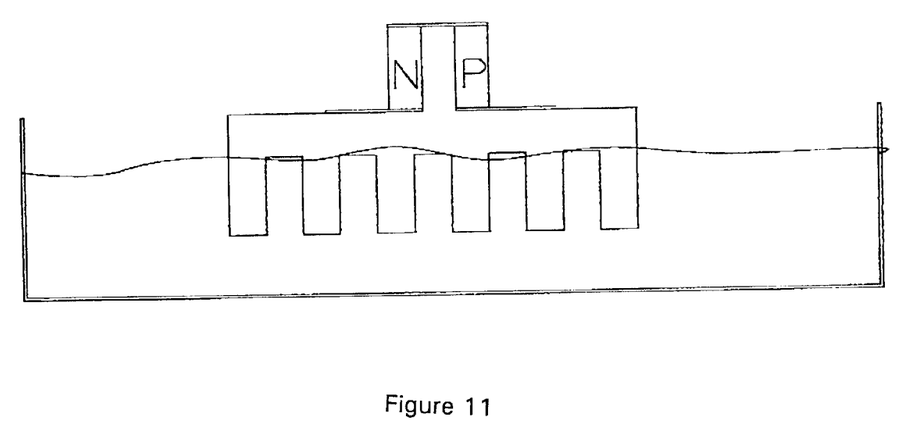
FIG. 11 is a schematic diagram illustrating heat dissipation from the semiconductor refrigeration pile of FIG. 10.
Figure 12:
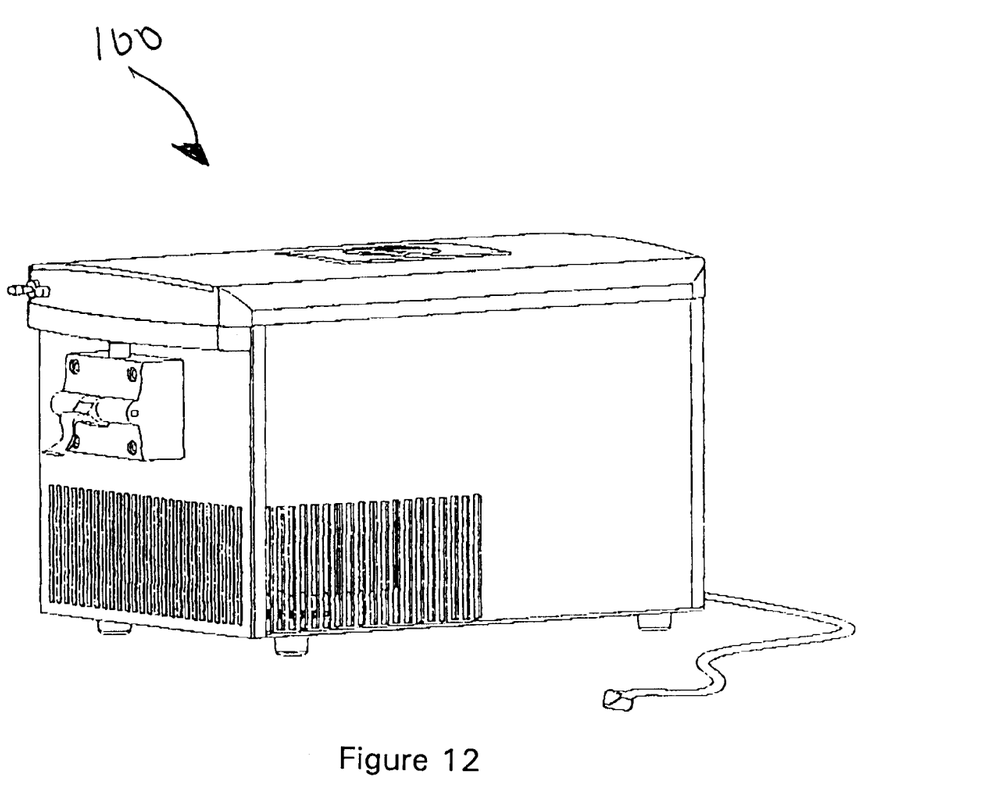
FIG. 12 is a frontal perspective view of the ice cream machine of FIG. 1.

FIG. 9 illustrates that a plurality of P-N semiconductor thermocouples can be connected to form a refrigerator using the Peltier effect. A seen in FIG. 8, energy in the form of electric current forces electrons from the P-type semiconductor to combine with molecules in the N-type semiconductor. This forced combination is an exothermic reaction that causes the release of heat. FIG. 9 illustrates that current flow forces electrons to separate from molecules in the semiconductor material and flow away from the P-N junction. This electron movement has an endothermic effect. In cumulative combination, these effects transfer heat from the upper connections (20) of FIG. 10 to the lower connections (21). FIG. 11 illustrates the exothermic end (lower connections (21)) of the P-N semiconductor refrigerator may be connected to a heat radiator to dissipate heat removed from the endothermic end of the refrigerator.

Refrigeration plates of varying cooling capacity can be formed by combining differing numbers of P-N semiconductor thermocouples electrically in series as illustrated in FIG. 9. The exothermic face of the refrigeration plate may be air cooled, as illustrated, or water-cooled. The largest temperature differential between the endothermic face of the refrigeration plate (3) and the ambient atmosphere is preferably 75° C.–78 C, that is, if the ambient temperature is 38 C endothermic face of the refrigeration plate may reach −40 C.

Of course, it must be understood that the exothermic and endothermic reactions may also be used to concentrate heat in a particular location. Such heat concentration may be used to heat or thaw foods, for example. It should also be noted that a reversal of current flow through the refrigeration plate will cause heat to be transferred from the heat radiator (5) to the guiding device (6).

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An ice cream machine, including a lower casing shell (14), a back casing shell (13), a top casing shell (12), a power switch (1), a refrigeration plate (3), a heat radiator (5), a cylindrical cold container having an axis (7), a motor (9), a stirring shaft (10) having an outer end and an inner end, wherein the refrigeration plate (3) abuts tightly on the cold container (7) to cool the cold container (7), the refrigeration plate (3) is placed beneath the cold container (7), the heat radiator (5) is placed under the refrigeration plate (3), the stirring shaft (10) is positioned along the axis of the cold container (7), the outer end of the stirring shaft (10) is connected with the motor (9) and the power switch (1) selectively applies power to the motor (9) characterized in that:

the refrigeration plate (3) comprises semiconductor refrigeration means for refrigerating said cold container (7).

2. An ice cream machine according to claim 1, wherein the semiconductor refrigeration means comprises:

plurality of P-N junction semiconductor refrigerators.

3. An ice cream machine according to claim 2, wherein the semiconductor refrigerators are powered by 12VDC.

4. An ice cream machine according to claim 2, wherein said ice cream machine further comprises an opening through which an ice cream mixture enters said cold container.

5. An ice cream machine according to claim 3, wherein said ice cream maker comprises a power supply (2) including a rectifier and a transformer, said power supply converting input AC power to an output of 12VDC.

6. An ice cream machine according to claim 1, wherein said ice cream maker comprises a cooling fan (4).

7. An ice cream maker according to claim 1, wherein said ice cream maker comprises a thermally conductive guiding device (6) connected to said refrigeration plate (3), said guiding device (6) configured to at least partially surround said cold container (7).

8. An ice cream maker according to claim 1, wherein said ice cream maker comprises expanded plastic material (8), said expanded plastic material surrounding the guiding device (6) to thermally insulate said guiding device and cold container (7) from the surrounding ambient heat.

9. An ice cream maker according to claim 1, wherein said ice cream maker comprises a control bar (11) for controlling the flow of ice cream.

* * * * *